United States Patent [19]

Urai

[11] 3,916,395

[45] Oct. 28, 1975

[54] CYLINDRICAL MAGNETIC DOMAIN STORAGE DEVICE HAVING WAVE-LIKE MAGNETIC WALL

[75] Inventor: Haruo Urai, Tokyo, Japan

[73] Assignee: Nippon Electric Company, Ltd., Tokyo, Japan

[22] Filed: Dec. 26, 1972

[21] Appl. No.: 318,134

[30] Foreign Application Priority Data

Dec. 28, 1971 Japan .................................. 47-1320

[52] U.S. Cl. ...................... 340/174 TF; 340/174 SR

[51] Int. Cl.$^2$ ................... G11C 11/14; G11C 19/08

[58] Field of Search ................. 340/174 TF, 174 SR

[56] References Cited

UNITED STATES PATENTS

| | | | |
|---|---|---|---|
| 3,676,872 | 7/1972 | Lock | 340/174 TF |
| 3,710,356 | 1/1973 | Bobeck et al. | 340/174 |
| 3,735,145 | 5/1973 | Heinz | 340/174 TF |

OTHER PUBLICATIONS

IEEE Transactions on Magnetics, "Interactions of Magnetic Domain Walls with Turn and Grain Boundaries in Orthoferrites" by Kurtzig; Vol. Mag. 6, No. 3, 9/70, pp. 497–500.

*Primary Examiner*—Stanley M. Urynowicz, Jr.
*Attorney, Agent, or Firm*—Sughrue, Rothwell, Mion, Zinn & Macpeak

[57] ABSTRACT

The present invention relates to a magnetic storage device for use in an information handling system including an electronic computer. More specifically, the present invention relates to a magnetic storage device in which holding and transferring of information are performed due to the interaction between a cylindrical magnetic domain (referred to hereunder as a bubble domain) and a magnetic domain existing in the vicinity of the bubble domain and having a wave-like magnetic wall.

11 Claims, 21 Drawing Figures

CYLINDRICAL MAGNETIC DOMAIN STORAGE DEVICE HAVING WAVE-LIKE MAGNETIC WALL

BACKGROUND OF THE INVENTION

It has heretofore been well-known from a paper titled "THE BELL SYSTEM TECHNICAL JOURNAL", Oct. issue, 1967, pp. 1901–1925 that a bubble domain is produced in a sheet of single crystal material such as rare earth orthoferrites when a uniform static magnetic field of suitable field intensity is applied perpendicular to the sheet. In an information storage device utilizing bubble domains, the functions of retaining the bubble domains at predetermined positions of the above-mentioned sheet and transferring them to predetermined positions are required. In order to propagate the bubble domains, it is necessary to apply a nonuniform magnetic field normal to the sheet of magnetic material in which the bubble domains are present. As a result, the bubble domains are moved along the gradient of the applied magnetic field.

A first example of the method of transferring bubble domains is stated in "IEEE TRANSACTIONS OF MAGNETICS", VOL. MAG-5, No. 3, Sept. issue, 1969, pp. 552–553. In this method, the arrays of patterns made of a soft magnetic material and represented by T- and I-shaped patterns are provided on a sheet, and a rotating magnetic field is externally applied within a plane of the sheet so as to successively magnetize the arrays of patterns depending on the directions of the rotating field. For this reason, the bubble domains are propagated and held by nonuniform magnetic field established due to the magnetization of the T- and I-shaped patterns normal to the plane of the sheet.

A second example shown in pp. 548–551 of the above-mentioned reference, in which loop-shaped conductor patterns are arrayed in the propagation path of bubble domains. In this method, current is caused to flow selectively through the conductor patterns, and the propagation operation is performed in the similar manner to the above by magnetic field induced from the loop-shaped conductors.

In a third example known as an angelfish-type circuit disclosed in pp. 551–552 of the same reference, the interaction between bubble domains and wedge-shaped "angelfish" pattern arrays disposed on a sheet of a soft magnetic material is utilized to modulate a static magnetic field for holding the bubble domains, thereby permitting the propagation of the domains. The retention of bubble domains is a specified form of the propagation and is equivalent to a state under which they are not transferred.

Thus, in the above-mentioned methods of propagating and retaining bubble domains, the patterns represented by T- and I-shaped patterns, wedge-shaped angelfish patterns, or loop-shaped conductor patterns must be disposed at a position where each bubble domain as a carrier of information is retained. However, in case where the size of the bubble domain becomes small, or where the quantity of information to be retained becomes large, it is technically more difficult to manufacture the patterns on the sheet. Moreover, with the foregoing methods of retaining and moving bubble domains, two or more bubble domains each corresponding to 1 bit of information cannot be held in individual ones of the above-mentioned T- and I-shaped patterns, angelfish patterns, or conductor patterns. As a result, these prior art methods have disadvantages that they are suited for the transferring and holding of digital information but not for those of analog information.

SUMMARY OF THE INVENTION

It is, therefore, one object of the present invention to provide a magnetic storage device free from the above-mentioned disadvantages of the prior art methods.

The magnetic storage device of the present invention comprises: a magnetic material sheet capable of retaining bubble domains; means for applying a magnetic field so that its normal component to be applied to the sheet may have a predetermined gradient in order to maintain a plurality of bubble domains generated within the sheet and a magnetic domain having a wave-like magnetic wall to retain the bubble domains; means for giving a substantially normal and modulated magnetic field to the sheet in order to move the bubble domains and the magnetic domain having the wave-like magnetic wall; and means for generating the plurality of bubble domains in the vicinity of the wave-like magnetic wall.

BRIEF DESCRIPTION OF THE DRAWINGS

The present invention will now be described in more detail in conjunction with the accompanying drawings.

DETAILED DESCRIPTION OF THE INVENTION

Figure 1:
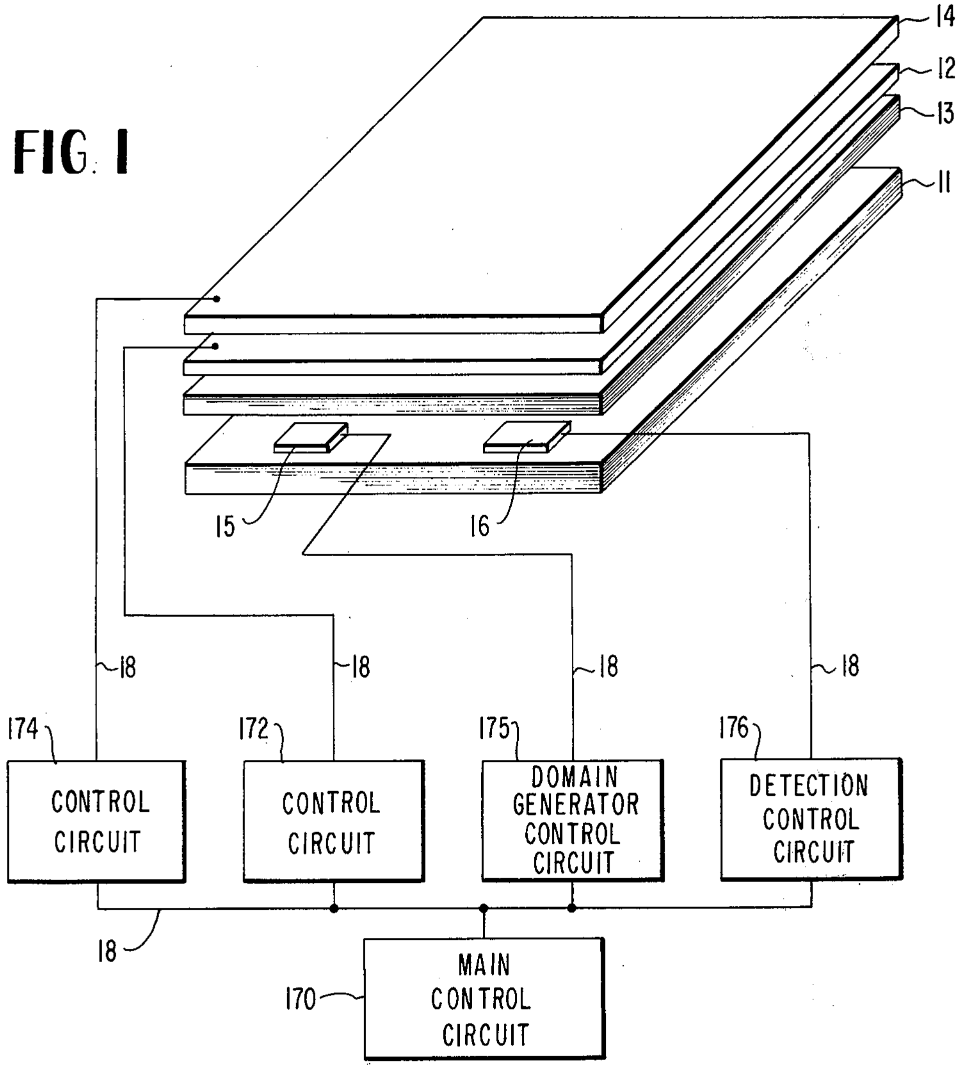
FIG. 1 shows a schematic diagram of the present invention.

FIG. 1 which shows a diagram of various structures which may be used in the various embodiments described hereinafter, comprises: a sheet 11 of magnetic material for holding bubble domains; a bubble domain-generation control section 15 disposed on the sheet 11; a bubble domain-generation control circuit 175 for controlling the control section 15; a bubble domain detecting section 16; a bubble domain-detection control circuit 176 for controlling the detecting section 16; a sheet 13 of magnetic material disposed on the sheet 11 serving as means for applying a magnetic field substantially normal to the sheet 11 in order to keep wave-like magnetic domains in the vicinity of bubble domains within the sheet 11; means 12 for applying an external magnetic field for holding the bubble domains substantially normal to the sheet 11; a circuit 172 for controlling the means 12; means 14 to move the bubble domains and the wave-like magnetic domains for transferring the bubble domains; a circuit 174 for controlling the means 14; a main control circuit 170 for controlling the control circuits 172, 174, 175 and 176; and signal lines 18 connecting the respective circuits. An element known by a paper "JOURNAL OF APPLIED PHYSICS," VOLUME 42, NUMBER 4, Mar. issue, 1971, pp. 1251–1257 is employed in the bubble domain detecting section 16.

Figure 2:
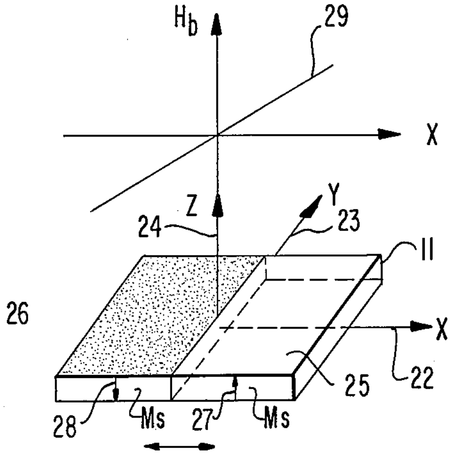
FIG. 2 shows a diagram for explaining the principle of the present invention.

FIG. 2 shows a diagram for explaining the means 12 and 14 for retaining and propagating the bubble domains. More definitely, in FIG. 2 which shows the relationship between the sheet 11 having a saturation magnetization $M_s$ and the intensity of a magnetic field applied perpendicular to the surface of the sheet 11, coordinates having X-axis 22, Y-axis 23 and Z-axis 24 are indicated such that the plane of the sheet 11 cut out in a plane normal to an easy axis and taking a flat form makes the X-Y plane of the spacial orthogonal coordinate system. A straight line 29 in the X-Z plane represents the X-axis distribution of the intensity of the magnetic field $H_b$ normal to the sheet 11. The normal magnetic field $H_b$ is constant in the Y-axis direction and variable in the X-axis direction in such a manner that the field intensity increases rectilinearly from negative values with increase of X and that it is inverted at X = 0. When the gradient of the magnetic field becomes sufficiently large, a magnetic domain 25 magnetized in a certain direction (the magnetized state is shown by an arrow 27) and a magnetic domain 26 magnetized in the opposite direction (the magnetized state is indicated by an arrow 27) are generated within the sheet 11 with their boundary along the Y-axis 23 at which the magnetic field intensity is 0.

By the introduction of a number of bubble domains into the vicinity of a magnetic wall along the Y-axis 23 within a predetermined range of the gradient value of the normal magnetic field with a method referred to below, the bubble domains are arrayed along the magnetic wall at a constant interval as is slightly spaced from the magnetic wall in the vicinity of the Y-axis 23. Due to such array of the bubble domains, the magnetic wall is brought into a wave-like form.

According to an article IEEE TRANSACTIONS ON MAGNETICS, VOL. MAG-6, No. 3, Sept. issue, 1970, p. 498, FIG. 3, it is known that only one bubble domain exists in proximity to the wave-like magnetic wall. The article, however, merely teaches the existence of one bubble domain. Consequently, it does not intend to design an information storage for performing the retaining and moving of the bubble domain.

Figure 3A:
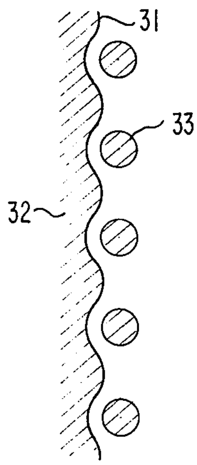
FIGS. 3A through 3D show diagrams of an arrayed state of bubble domains in the magnetic storage device of the invention.
Figure 3B:
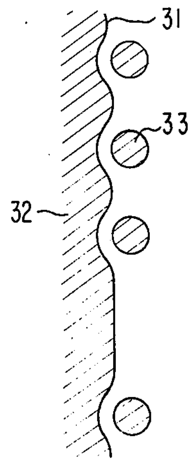
Figure 3C:
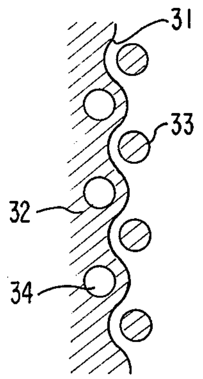
Figure 3D:
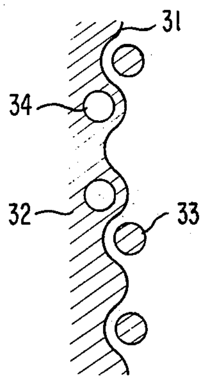

In FIGS. 3A through 3D which show arrangements of bubble domains used as information in the magnetic storage device of the invention, the interval or spacing between the bubble domains 33 located by the side of a wave-like magnetic wall 31 is determined by the magnetic material of the sheet 11 of FIG. 2. More specifically, in a yttrium orthoferrite ($YFeO_3$) sheet 11 having a thickness or 60 microns, bubble domains each having a diameter of 170 microns are arrayed at an interval of 600 μm (microns) under a magnetic field gradient of 1,000 Oe/cm (Oersteds per centimeter). The direction of magnetization of the bubble domain 33 is the same as that of a magnetic domain 32 located on the opposite side to the bubble domain 33 with its boundary at the magnetic wall 31. Bubble domain 34 is present within the magnetic domain 32, and is opposite to the direction of magnetization of the bubble domain 33. Even if an arbitrary number of bubble domains are eliminated from the arrays of the bubble domains in FIGS. 3A and 3C, the array positions occupied by the remaining bubble domains are not almost altered as compared with the originally arrayed positions of them. This is illustrated in FIGS. 3B and 3D. It is also possible to directly array bubble domains as shown in FIGS. 3B and 3D by the use of the bubble domain generating means 15 hereinafter stated. At such arrays of bubble domains, the holding of information corresponds to the presence or absence of the arrayed bubble domains, or the arrayed states of the bubble domains. Thus, the information is held without using the patterns represented by T- and I-shaped patterns or conductor patterns.

Figure 4A:
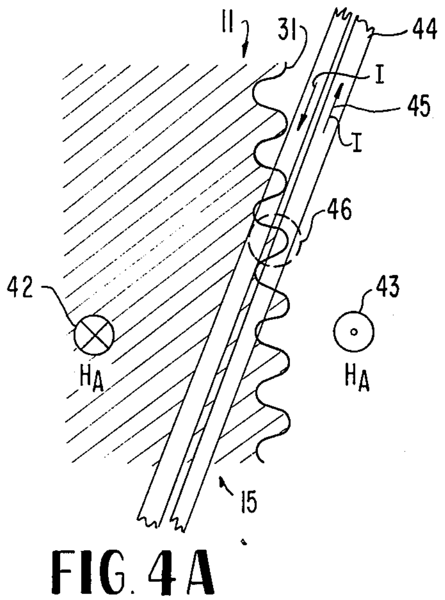
FIGS. 4A and 4B show diagrams of the first example of bubble domain generating means of the invention.
Figure 4B:
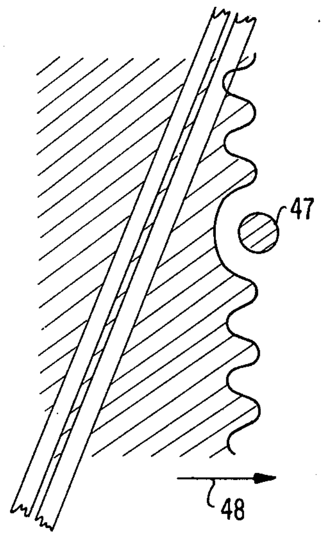

In FIGS. 4A and 4B which illustrate the first example of the bubble domain generating means 15 of FIG. 1 for introducing a bubble domain along the magnetic wall formed along the Y-axis of the sheet 11 in FIG. 2, the generating means 15 on the sheet 11 is viewed perpendicular to the plane of the sheet 11. The directions of the magnetic field $H_A$ applied to the sheet 11 are indicated by symbols 42 and 43. The symbols 42 and 43 mean that the directions are opposite to each other. The generating means 15 disposed on the sheet 11 consists of two-way (for going and returning) conductor wire 44 defining a predetermined angle with respect to the direction of the gradient of the applied magnetic field (or, the X-axis direction in FIG. 2). From a paper "JOURNAL OF APPLIED PHYSICS," VOLUME 41, NO.. 3, Mar. issue, 1970, pp. 1161 – 1162, it has been known that at the gradient of the applied field smaller than a certain value, the magnetic wall 31 deviates from the Y-axis in FIG. 2 to become wavy. When the conductor wire 44 is elongated across a position shown by a dotted line circle 46 in FIG. 4A, namely, when the space between the wire for going and that for returning of the both-way wire 44 extends across one convex portion of the wave-like wall 31, the convex portion is split into a bubble domain 47 by causing current as shown by arrow 45 to flow through the wire 44. If the line (or in other words, Y-axis in FIG. 2) on which the normal component of the external magnetic field given to the sheet 11 is zero is transferred in a direction indicated by an arrow 48 in FIG. 4B, the bubble domain 47 and the wave-like magnetic wall 31 retaining the bubble domain is moved to go away from the wire 44. Thus, the bubble domains corresponding to information are generated in the vicinity of the wave-like wall 31 in such a way that while the magnetic wall 31 is being moved in the direction of the arrow 48, control current pulses are supplied to the wire 44. Also if the direction of the current pulses is switched to the reverse one, the bubble domains differing in the polarized direction from each other as illustrated in FIGS. 3C and 3D appear on both sides of and in proximity to the wave-like magnetic wall 31. In the case where the wire 44 is arranged in the Y-axis direction in FIG. 2, or in the direction normal to the gradient of the external magnetic field, and where the space between both two ways of the wire 44 crosses all the convex portions of the wave-like magnetic wall 31, all the convex portions of the wall 31 are split by the application of one current pulse or by a set of positive and negative current pulses. Thus, the array of the bubble domains as shown in FIG. 3A or FIG. 3C is formed at one step corresponding to the respective current pulses. For instance, the above-mentioned operation is made possible by one current pulse of 500 mA (milliamperes) at a field gradient of 1,000 Oe/cm (Oersteds per centimeter) with a 60 micron thick yttrium orthoferrite ($YFeO_3$) sheet.

Figure 4C:
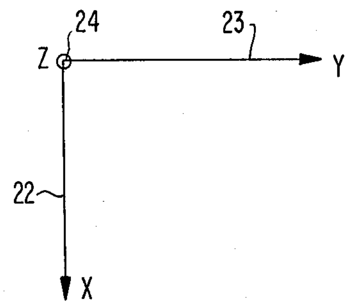
FIGS. 4C through 4E show diagrams of the second example of the bubble domain generating means.
Figure 4D:
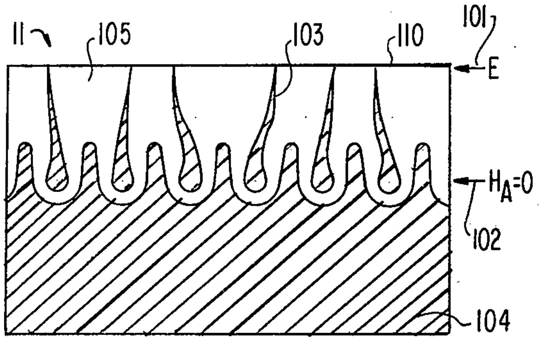
Figure 4E:
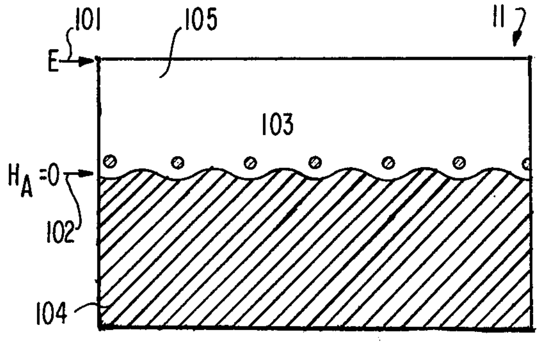

In FIGS. 4C through 4E which show diagrams for explaining the second example of the bubble domain generating means 15, the sheet 11 of FIG. 2 is viewed in a direction perpendicular to the plane thereof. The generating means 15 utilizes crystal defects of the sheet 11. The crystal defect includes the end of a crystal. FIG. 4C represents a spacial coordinate system, or X-axis 22, Y-axis 23 and Z-axis 24 directed from the back towards the front of the sheet of the drawing. The sheet 11 is assumed to be placed on the X-Y plane. In FIGS. 4D and 4E, a symbol E (numeral 101) designates the position of an edge 110 of the sheet 11, while a symbol $H_A = 0$ (numeral 102) indicates the position of a line which is parallel to the Y-axis and on which the intensity of the magnetic field applied normal to the sheet 11 is zero. Within the sheet 11, a thickly colored part 104 is just reverse to the magnetized state of another part 105. The sheet 11 of FIG. 4D and 4E is made of a yttrium orthoferrite ($YFeO_3$) single crystal with the c-plane polished and having a thickness of 60 microns. Under the conditions with the above-mentioned magnetic field having a field gradient of 700 Oe/cm (Oersteds per centimeter) and with the crystal edge 110 located at the position shown in FIG. 4D, one end of a single-wall magnetic domain 103 is stuck to the crystal edge 110 due to its high coercive force. When the field gradient is increased to 1,200 Oe/cm (Oersteds per centimeter), the magnetic domain 103 overcomes the coercive force of the crystal edge to separate from the edge 110, and forms an array of bubble domains with an interval or pitch of 600 $\mu$m (microns) as shown in FIG. 4E.

The transfer operation of bubble domains corresponding to information is given below. As is apparent from the foregoing, when the line shown by numeral 102 (FIGS. 4D and 4E) on which the intensity of the sloped external field 29 (FIG. 2) becomes zero is moved in the direction of the slope, or in other words, in the X-axis direction 22 by applying a uniform static field substantially perpendicular to the sheet 11, the arrayed bubble domains are propagated in the X-axis direction along with the wave-like magnetic wall corresponding to the transfer of information.

Figure 5:
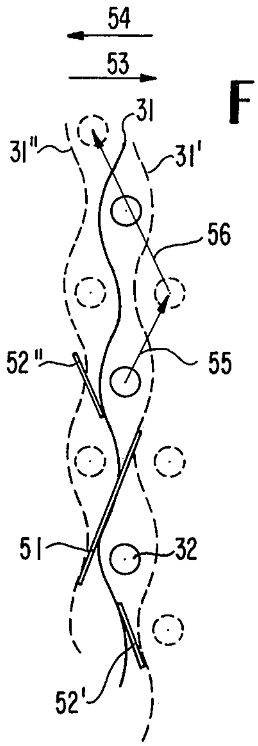
FIG. 5 shows a diagram of a magnetic wall propelling section of the invention for moving bubble domains and a wave-like magnetic wall appearing in the vicinity thereof in the extended direction of the magnetic wall.

FIG. 5 shows a diagram for explaining a method for moving bubble domains and a wave-like magnetic wall 31 retaining the bubble domains in a direction perpendicular to the direction of the gradient of the external magnetic field whose distribution of intensity forms a slope, namely, in the Y-axis direction in FIG. 2. In the drawing, the sheet 11 of FIG. 2 is viewed from above. It is known that if the sheet 11 has a stepped difference in its thickness, it is very difficult to move the magnetic wall within the sheet 11 through the stepped portion where the extended direction of the magnetic wall is parallel to the extension of the stepped portion, whereas it is very easy to move the magnetic wall past the stepped portion where the elongated direction of the wall is orthogonal to the extension of the stepped portion. Using this fact, the wave-like magnetic wall 31 can be moved in its elongated direction, namely, in the Y-axis direction in FIG. 2. The magnetic wall 31 of FIG. 5 is trapped in a fine groove-shaped pattern 51 cut into the surface of the sheet 11 (not shown). When the wall 31 is moved in the direction of an arrow 53 at this time point, it cannot pass through the groove-shaped pattern 51, and is moved into a direction along the pattern 51 in which it is easy to move. Since the magnetic wall 31 intersects with a groove-shaped pattern 52' substantially perpendicular thereto, the transfer of the wall 31 is little influenced by the passage through the pattern 52', and as a result, the magnetic wall 31 is moved in the direction of an arrow 55. Consequently, the bubble domain 32 in the vicinity of the magnetic wall 31 is propagated together with the wall 31 in the direction shown in the arrow 55. Then, as the wave-like wall 31' in the state thus moved is parallel to the pattern 52', in response to the movement of the magnetic wall 31 in the direction of an arrow 54, the bubble domain 32 in proximity to the wave-like wall 31 is transferred in the direction of an arrow 56 to become the wave-like wall 31'' by a similar manner to that mentioned above. In this way, the bubble domain 32 is propagated in the direction in which the magnetic wall 31 extends, that is, in the Y-axis direction of FIG. 2 together with the wall 31 through the magnetic wall propelling section 51, 52' and 52''.

Figure 6A:
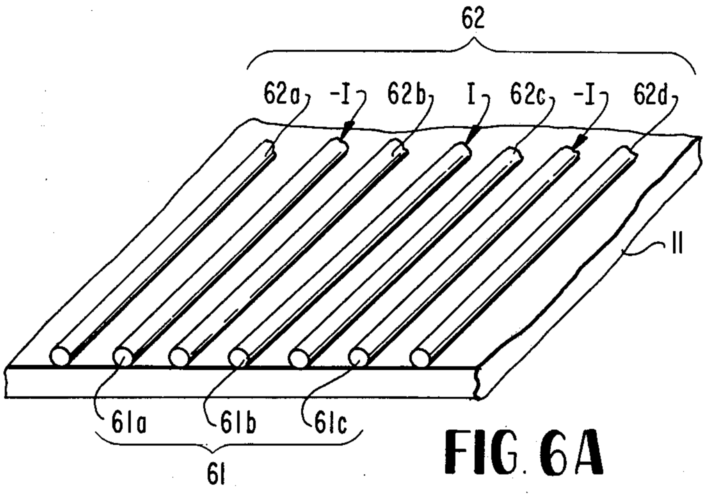
FIGS. 6A through 6D show an arrangement for creating and moving domain walls.
Figure 6B:
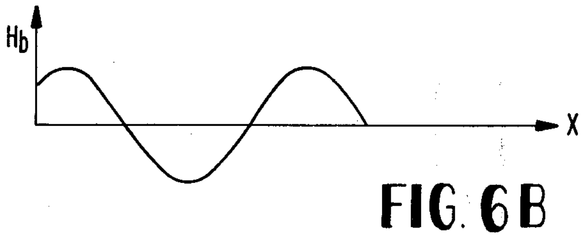
Figure 6D:
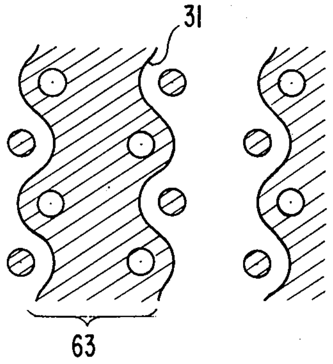
Figure 6C:
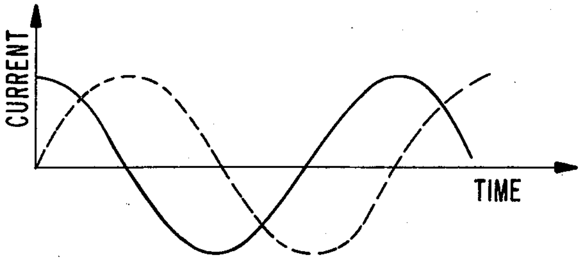

In FIGS. 6A through 6D the means 14 of FIG. 1 to move arrays of bubble domains in the X-axis direction of FIG. 2 is shown as comprising conductors 62. Referring to FIG. 6A, every other ones of conductor wires provided on the sheet 11 at equal intervals are connected in series to form two conductor wire groups 61 and 62. Stated more in detail, the wire groups 61 and 62 include the wires 61*a*, 61*b* and 61*c*, and the wires 62*a*, 62*b*, 62*c* and 62*d*, respectively. Also, the wires 61*a*, 61*b* and 61*c* are connected in series. When DC current in now caused to flow through the conductors of wire group 61, a magnetic field $H_b$ as shown in FIG. 6B is applied to the sheet 11. Thus, a stripe-shaped magnetic domain 63 having the wave-like magnetic wall 31 and with an interval corresponding to that of the conductor wires is generated. Subsequently, both the application of an AC current shown by a curve of solid line in FIG. 6C to the conductor wire group 61 and the application of an AC current shown by a broken line and shifted in phase by 90° from the AC current of the solid line to the conductor wire group 62 cause the stripe-shaped domain 63 to be gradually moved in an X-axis direction shown in FIG. 6B. At this time point, if the bubble domains are introduced into the magnetic wall portion 31 of the domain 63 under controlled condition by the use of the bubble domain generating means 15 shown in FIGS. 4A to 4E, the bubble domains as illustrated in FIG. 6D and the wave-like magnetic wall 31 for retaining the bubble domains are moved together, and thus, the transfer of information by the bubble domains is carried out. It is a matter of course that by the application of the uniform magnetic field for modulation normal to the sheet 11 having the domain array kept by the magnetic field 29 of FIG. 2 and shown in FIGS. 3A through 3D, the line on which the component of the magnetic field $H_b$ normal to the sheet 11 is 0 can be moved.

Figure 7:
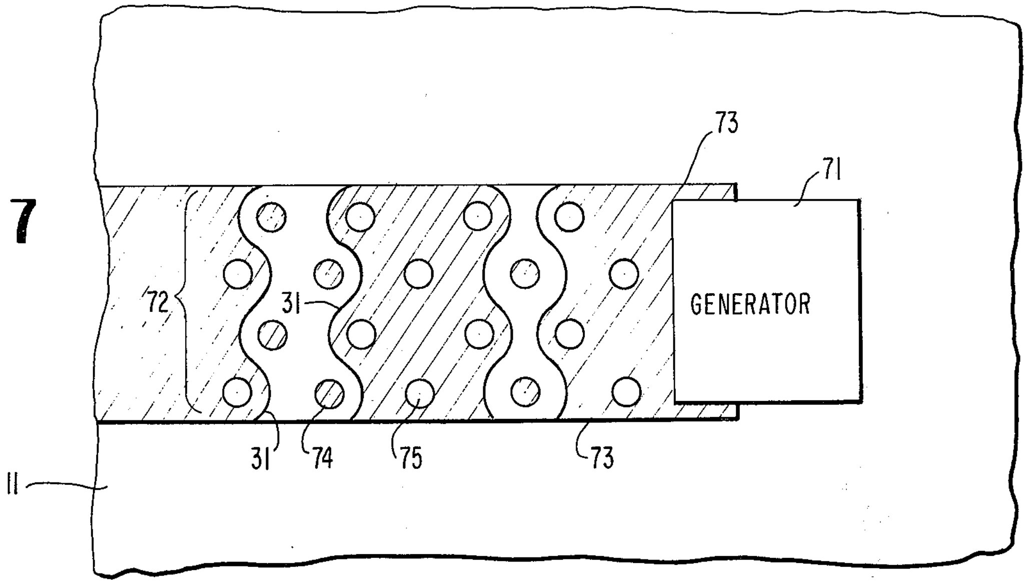
FIG. 7 shows a bubble generator and means for constricting the movement of bubble domains.

In FIG. 7 means to perform transfer of groups of bubble domains, namely, transfer of analog information is particularly shown. A groove 72 is engraved in the surface of the sheet 11. A bubble domain 74 present in the groove 72 cannot go out beyond the boundary 73 of the groove 72. This is stated in JOURNAL OF APPLIED PHYSICS, VOLUME 42, No. 10, Sept. issue, 1971, p. 3872. Using a bubble domain generator 71, for example, one known by an article IEEE TRANSACTIONS ON MAGNETICS, VOLUME MAG-7, Sept. issue, 1971, p. 741, FIG. 1, bubble domains 74 and 75 of both polarities are generated within the groove 72 while the static magnetic field normal to the sheet 11 is being modulated. Then, due to the interaction of magnetic fields from the magnetic domains produced within the sheet 11 itself, the distribution of magnetic field intensity as shown in FIG. 2 is established partially (for example, in the neighborhood of the wave-like magnetic wall 31). It is thus made possible that the bubble domains 74 and 75 of both polarities are successively arrayed into the vicinity of the wave-like wall 31 under the controlled condition. The number of the bubble domain 74 or 75 having a certain polarity can be controlled in this manner by means of the generator 71 corresponding to analog information, whereby analog information is retained and transferred.

Figure 8A:
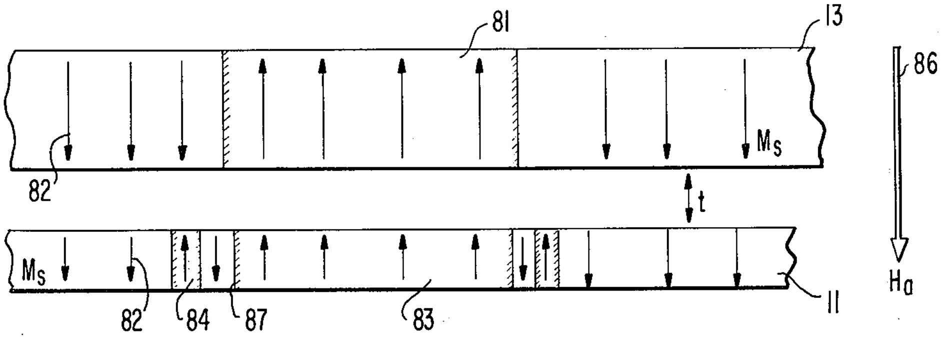
FIGS. 8A through 8C show an arrangement for creating a circular domain wall having generally wavy circumference.
Figure 8B:
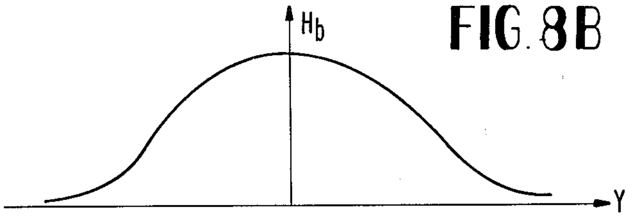
Figure 8C:
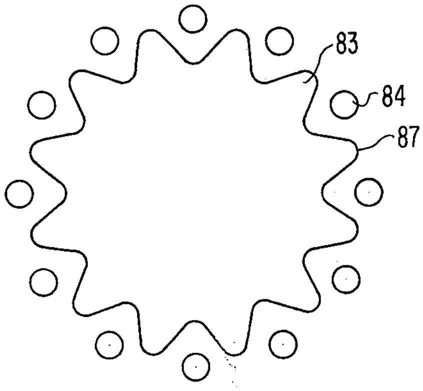

In FIGS. 8A through 8C which show means to retain and transfer analog information by the use of groups of bubble domains, immediately above the sheet 11, another sheet 13 of magnetic material is stacked with a predetermined spacing t therebetween. As compared with the sheet 11, the sheet 13 has the characteristics that the saturation magnetization $M_s$ and the size of bubble domains to be held therein are larger than those in the sheet 11 and that the range of the static field in which the bubble domains exist stably is equal to that of the sheet 11. The range of the static (bias) magnetic field can be regulated by controlling the thickness of the sheet, as is known by a paper JOURNAL OF APPLIED PHYSICS, VOLUME 41, No. 3, Mar. issue, 1970, pp. 1139 – 1145. The distribution of leakage magnetic fields from a bubble domain 81 existing in the sheet 13 is substantially as shown in FIG. 8B. In the drawing, the abscissa represents the distance *r* from the center of the bubble domain 81, while the ordinate indicates the intensity of the component of the leakage magnetic fields $H_b$ normal to the plane of the sheet 13. An external magnetic field (or, in other words, a static magnetic field) $H_a$ for holding bubble domains 81 and 84 is applied as shown by an arrow 86 in FIG. 8A. Under the state of $H_a < H_b$ and at this time point, a magnetic domain 83 corresponding to the size of the bubble domain 81 and having a closed magnetic wall 87 larger than the bubble domain 84 is formed within the sheet 11. The bubble domain 84 undergoes a repulsive force from the magnetic domain 83. However, as pointed out by a paper "Magnetism and Magnetic Material" published in 1972, pp. 135–139 in "AIP Conference Proceedings No. 5," Part 1, if the bubble domain 84 lies within a range satisfying $r < \sqrt{2}t$ from the center of the bubble domain 81, it undergoes an attractive force from the domain 81. As a result, both are balanced, and the bubble domain 84 occupies its position near the wave-shaped magnetic wall 87 of the magnetic domain 83 as shown in FIG. 8C. In FIG. 8C, the maximum number of bubble domains 84 whcih can exist around the magnetic domain 83 is determined by the characteristics of the sheets 11 and 13. They can be value. On the basis of this disclosed fact, analog information can be retained. The bubble domain 81 is large and easy to handle, and may be formed in a conventional material such as orthoferrites. When such a bubble domain 81 is transferred by the prior-art method, the group of bubble domains 84 can also be propagated within the sheet 11 depending on the transfer of the domain 81. In other words, analog information is moved within the sheet 11 by the bubble domain 81. The propagation of the bubble domain 81 can be effected simpler than direct transfer of the bubble domain 84. The generation of the bubble domains 84 may be carried out in response to analog information by the method illustrated in FIGS. 4A through 4E.

Figure 9:
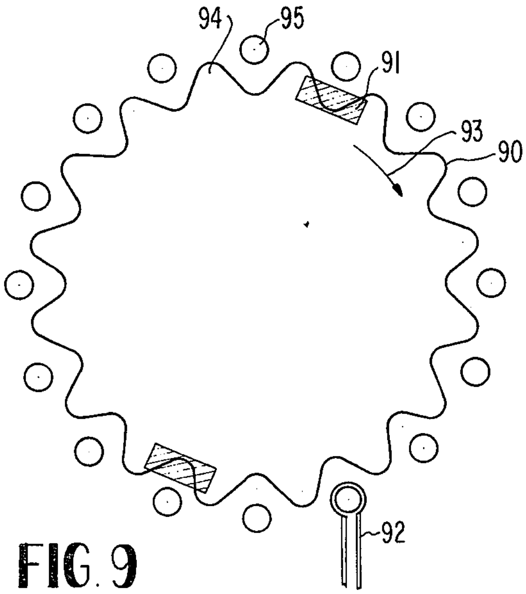
FIG. 9 shows a circular, wavy-circumference, domain wall and means for controlling the direction of movement of said domain wall.

In FIG. 9 which shows the construction of a shift register employing bubble domains, a magnetic domain 94 and a bubble domain 95 are assumed to have been formed by the method explained with reference to FIGS. 8A to 8C. The shift register of such construction functions in the manner as follows. More particularly, when a notice is directed to one part 91 of a closed wave-like magnetic wall 90, the part 91 may be considered to have the same domain construction as the wave-like magnetic wall 31 in FIG. 5. If the magnetic wall propelling section 51, 52′ and 52″ as shown in FIG. 5 are given to the part 91, the magnetic wall 90 proceeds in one direction. Then the magnetic wall 90 rotates in the direction of an arrow 93. The array of the bubble domain 95 rotates depending on the revolution on the domain 90. The arrayed bubble domain 95 generated in response to information by employing the bubble domain generating means described with reference to FIGS. 4A through 4E are sequentially read out by a detector 92.

As is apparent from the above-mentioned embodiments, the transfer of analog information with bubble domains as has been difficult in the prior-art methods can be performed remarkably easily according to the invention. Besides, the manufacturing steps are widely reduced since patterns, such as TI-patterns and conductor patterns corresponding to the individual bubble domains and for retaining and transferring the bubble domains become unnecessary.

It will be apparent however that a number of alternatives and modifications can be made within the scope of the present invention defined by the appended claims.

What is claimed is:

1. A magnetic domain storage device comprising, a. a sheet of magnetic material capable of retaining bubble domains within a plane substantially normal to the easy magnetic axis of said material, b. means for applying an external magnetic field substantially normal to said plane and having a magnetic field gradient along an axis of said plane, said gradient passing through zero field at least one point along said axis, to cause at least one domain wall in said sheet of material, c. means for creating bubble domains in said sheet of magnetic material adjacent to said wall domain, and d. means for causing said wall domain to move along said sheet whereby said bubble domains are carried along by the movement of said wall domain.

2. A magnetic domain storage device as claimed in claim 1 wherein said external magnetic field is at a value which results in said domain wall having alternate concave and convex portions resulting in an overall wave-like shape of said domain wall.

3. A magnetic domain storage device as claimed in claim 1 wherein said means for creating said bubble domains comprises a pair of conductors substantially parallel to one another on said sheet, and means for applying current pulses in opposite directions through said parallel conductors to cause convex portions of said domain wall which are between said conductors to break away from said wall and form said bubble domains.

4. A magnetic domain storage device as claimed in claim 3 wherein said pair of conductors is placed on said sheet forming an acute angle with the extended direction of said domain wall, and means for modulating said applied external field to cause said domain wall to move in a direction normal to the extended direction of said domain wall, whereby different ones of the convex portions of said domain wall pass through the space between said pair of conductors as said wall moves.

5. A magnetic domain storage device as claimed in claim 3 wherein said pair of conductors is placed on said sheet in a direction substantially parallel to the extended direction of said domain wall.

6. A magnetic domain storage device as claimed in claim 1 wherein said sheet of magnetic material has a crystal defect along an edge thereof and wherein said means for creating bubble domains comprises, means for modulating said externally applied magnetic field between a first value low enough to result in plural single domain walls extending from said edge toward a domain wall across said sheet at the 0 field axis of said gradient, and a second value high enough to cause said single domain walls to break away from said edge and form bubble domains.

7. A magnetic domain storage device as claimed in claim 1 wherein said means for causing said wall domain to move comprises, means for modulating said applied magnetic field to cause the 0 field point on said gradient axis to move along said axis.

8. A magnetic domain storage device as claimed in claim 1 wherein said means for applying an external magnetic field comprises, a. a first plurality of parallel conductors in a plane parallel to the plane of said sheet of material, and b. means for causing a current to flow through said parallel conductors, whereby adjacent ones of said conductors carry current in opposite directions, resulting in a sinusoidal gradient of magnetic field along an axis perpendicular to said parallel conductors.

9. A magnetic domain storage device as claimed in claim 8 wherein said means for causing said wall domain to move comprises, a. a second plurality of parallel conductors positioned parallel to said first plurality of conductors, each one of the conductors of said second plurality being positioned between an adjacent pair of said first plurality of conductors, said second plurality of conductors being serially connected to cause current to flow in opposite direction in adjacent ones of said second plurality of conductors, b. means for A.C. modulating the current through said first plurality of conductors, and c. means for applying an A.C. current to said series connected second plurality of conductors, said A.C. current being 90° out of phase with the A.C. current in said first plurality of conductors.

10. A magnetic domain storage device as claimed in claim 7 wherein said means for causing said wall domain to move further comprises, at least one first groove in the surface of said sheet positioned to impede domain wall movement in a first direction perpendicular to the extended direction of said wall when said wall is at a first position, and at least one second groove in the surface of said sheet positioned to impede domain wall movement in a second direction opposite said first direction when said wall is at a second position, whereby said grooves cause said domain wall to move in a direction substantially the same as said extended direction of said wall.

11. A magnetic domain storage device as claimed in claim 1 wherein said means for applying an external magnetic field comprises, a. a second sheet of magnetic material capable of retaining bubble domains of substantially larger size than those which can be retained in said other sheet, said second sheet being disposed in a plane parallel to the plane of said other sheet and sufficiently close to said other sheet so that a bubble domain in said second sheet influences the magnetic field applied to said other sheet, and b. means for applying a static magnetic field normal to the planes of said second and other sheets, said magnetic field being sufficient alone to enable said second and other sheet to retain bubble domains and being less than and in opposite direction to the leakage magnetic field imposed on a corresponding area of said other sheet by a bubble domain in said second sheet, said static field and leakage field causing a magnetic domain in said other sheet having a wave shaped wall of comparable size to the bubble domain in said second sheet.

* * * * *

UNITED STATES PATENT AND TRADEMARK OFFICE
CERTIFICATE OF CORRECTION

PATENT NO. : 3,916,395
DATED : October 28, 1975
INVENTOR(S) : Haruo URAI

It is certified that error appears in the above-identified patent and that said Letters Patent are hereby corrected as shown below:

Column 7, line 59 - delete "$r < \sqrt{2}t$" and insert -- $r < \sqrt{2}\,t$ --
line 68 - after "They can be" insert --present by any desired number within the maximum--

Column 8,
line 30 - delete "on the domain" and insert -- of the domain --

Signed and Sealed this

Fourteenth Day of September 1976

[SEAL]

*Attest:*

RUTH C. MASON
*Attesting Officer*

C. MARSHALL DANN
*Commissioner of Patents and Trademarks*